United States Patent Office 3,804,919
Patented Apr. 16, 1974

3,804,919
SYNERGISTIC BLENDS OF MODIFIED POLYOLEFINS AND UNMODIFIED POLYOLEFINS
Albert Schrage, East Orange, and Arnold B. Finestone, Woodcliff Lake, N.J., assignors to Dart Industries, Inc., Los Angeles, Calif.
No Drawing. Continuation-in-part of abandoned application Ser. No. 246,000, Apr. 20, 1972, which is a division of application Ser. No. 147,187, May 26, 1971, now Patent No. 3,696,069. This application Dec. 14, 1972, Ser. No. 315,045
Int. Cl. C08f 29/12, 35/02
U.S. Cl. 260—827
9 Claims

ABSTRACT OF THE DISCLOSURE

Synergistic effects in certain physical properties have been found in blends of unmodified polyolefins with polyolefins which have been modified by reaction with polymerizable compounds defined by

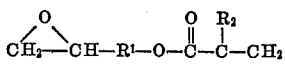

and/or

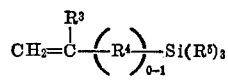

in the presence of an organic peroxide. The blends are particularly suitable in application requiring good adhesion to polar surfaces such as metal and glass.

---

This application is a continuation-in-part of application Ser. No. 246,000, filed Apr. 20, 1972, and now abandoned which in turn is a division of application Ser. No. 147,187, filed May 26, 1971, now U.S. Pat. No. 3,696,069.

This invention relates to blends of modified polyolefin compositions and unmodified polyolefin compositions which exhibit synergistic effects in certain physical properties such as adhesiveness characteristics.

Modified polyolefin compositions having good adhesiveness characteristics, particularly toward polar materials, are described in applications Ser. No. 81,526, filed Oct. 16, 1970 now U.S. Pat. No. 3,696,169; Ser. No. 129,629 filed Mar. 30, 1971 now U.S. Pat. No. 3,699,186, entitled "Modified Polyolefin Compositions Having Controlled Melt Flow" (Schrage and Readio); and Ser. No. 253,090, filed May 15, 1972, which is a division of Ser. No. 129,623, filed Mar. 30, 1971, now abandoned, entitled "The Use of Xylene in Controlling Melt Flow of Modified Polyolefin Compositions" (Schrage and Readio). These compositions are formed, in general, by reacting an olefin polymer with certain ethylenically unsaturated polymerizable compounds in the presence of an organic peroxide. Certain acrylic esters of diols and triols or xylene may be included in the reaction mass if desired to control the melt flow of such modified polyolefin compositions. While these compositions do possess good adhesiveness characteristics and at the same time substantially retain their other physical properties they do involve the use of additional materials and processing steps as compared to unmodified polyolefin compositions and thus, for economic reasons, their use is limited to specialized applications rather than general purpose applications.

In accordance with this invention it was quite unexpectedly found that a blend of modified polyolefin compositions as described above with an unmodified polyolefin exhibits certain synergistic effects in adhesiveness characteristics. In general, the blends of the invention comprise from about 1% to 50% by weight of the modified polyolefin composition and from about 50% to 99% by weight of the unmodified polyolefin although it would be expected that the synergistic effects would be obtained irrespective of the relative proportions of the blend components.

The modified polyolefin compositions useful in the blends are those described in the aforementioned copending applications. These compositions are generally derived by reacting an olefin polymer and 0.01% to 10% by weight based on the olefin polymer of a polymerizable compound defined by

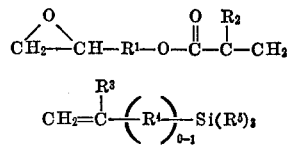

wherein $R^1$, $R^2$, $R^3$, $R^4$ and $R^5$ are hereinafter defined, in the presence of an organic peroxide. Preferably, about 0.1% to 5% by weight of the polymerizable compound is employed.

The olefin polymer from which the modified compositions are derived include those derived from alpha-olefin monomers having 2 to 10 carbon atoms. By way of example, there are included polyethylene, polypropylene, poly(butene-1), poly(4-methyl-pentene-1), ethylene-propylene random and block copolymers and terpolymers of ethylene-propylene-butene-1 as well as many other.

The polymerizable compounds include those defined by

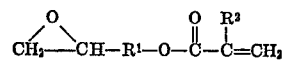

wherein
$R^1$ is a cyclic, straight or branched chain alkylene group having 1 to 20 carbon atoms;

a

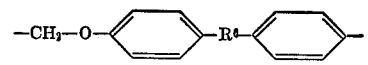

group wherein $R^6$ is a straight or branched chain alkylene radical having 1 to 10 carbon atoms, oxygen, sulfur, amino,

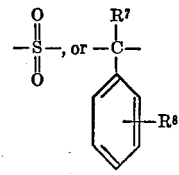

wherein $R^7$ is H or lower alkyl and $R^8$ is lower alkyl;

a $\{R^9—X—R^9\}_p$ group wherein each $R^9$ is a straight or branched chain lower alkylene, X is an amino group or an oxygen or sulfur atom, and $p$ is an integer of 1 to 20;

a 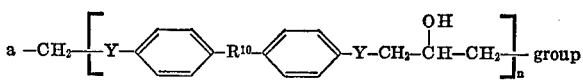 group wherein Y represents oxygen or sulfur atoms; $R^{10}$ is a straight or branched chain alkylene radical having 1 to 10 carbon atoms,

oxygen, sulfur, or

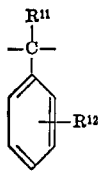

wherein $R^{11}$ is H or lower alkyl and $R^{12}$ is lower alkyl; and $n$ is an integer of 1 to 20;

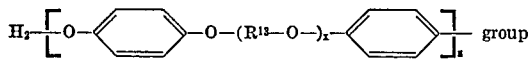 group wherein $R^{13}$ is lower alkyl, $x$ is an integer of 1 to 10 and $z$ is an integer of 1 to 10;

 group wherein $R^{14}$ is lower alkyl and $r$ is an integer of 1 to 100;

a 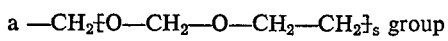 group wherein $s$ is an integer of 1 to 100;

and $R^2$ is H or $CH_3$. Preferably, $R^1$ is a $C_1$–$C_{18}$ alkylene group and $R^2$ is H or $CH_3$.

By way of specific example of some of the compounds included in this definition there may be mentioned glycidyl acrylate; glycidyl methacrylate; the acrylic and methacrylic esters of the monoglycidyl ether of sulfonyl bisphenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of α,α-bis(p-hydroxyphenyl) tolylethane; the acrylic and methacrylic esters of 3-oxy-6,7-epoxyheptanol; the reaction products of one mole of acrylic or methacrylic acid with one mole of polyphenylenesulfide diglycidyl ether, polyphenyleneamine diglycidyl ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with α,α-bis(p-hydroxyphenyl) tolylethane or α,α-bis(p-thiophenyl) tolylethane; the acrylic and methacrylic esters of poly ($C_1$–$C_4$ alkyleneoxide glycol) monoglycidyl ether; and the acrylic and methacrylic esters of poly [(co-alkylene-phenylene-oxide) glycol] monoglycidyl ether. All of these compounds are disclosed in copending application Ser. No. 81,527 filed Oct. 16, 1970, now U.S. Pat. No. 3,701,751.

Also included within the polymerizable compounds are those compounds defined by

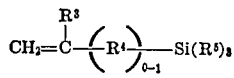

wherein $R^3$ is hydrogen or an alkyl radical having 1 to 4 carbon atoms;

$R^4$ is a straight, branched or cyclic alkylene radical having 1 to 10 carbon atoms with or without pendant glycidoxy groups; a substituted or unsubstituted phenylene group with or without pendant glycidoxy groups;

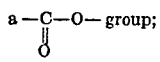

a 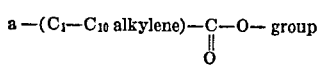 group with or without pendant glycidoxy groups;

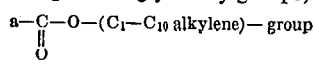 group with or without pendant glycidoxy groups; or a 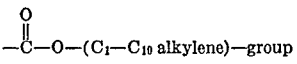 group with or without pendant glycidoxy groups; and $R^5$ is halogen (bromine or chlorine in particular), an alkoxy radical having 1 to 10 carbon atoms, or an acyloxy radical having 1 to 10 carbon atoms.

Preferably, $R^4$ is absent or a $C_1$–$C_{10}$ alkylene group while $R^3$ and $R^5$ are as described above.

Included within the above defined group of compounds are the following by structure

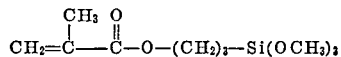

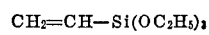

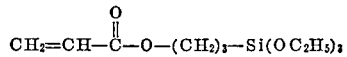

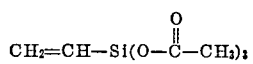

$CH_2=CH-\langle\ \rangle-Si(OCH_3)_3$ such compounds are commercially available.

The above olefin polymer and polymerizable compound are reacted in the presence of an organic peroxide, preferably 0.01% to 5% by weight based on the olefin polymer. Suitable organic peroxides useful in this invention include both solid and liquid organic peroxides. In order to insure good distribution of the peroxide throughout the mixture of ingredients prior to reaction it is preferred to use a liquid form of the peroxide. Thus, for convenience, those organic peroxides which are normally liquid or which become liquid at or near the temperature at which the particular reaction is run are preferred over the solid-type organic peroxides. However, by dissolving the solid organic peroxides in a small amount of a suitable organic solvent, that is one that has no substantial adverse effect on free radical polymerization reactions, a suitable physical form is obtained which can be used with substantially equal success in the process of the invention. Since the solvent, for this purpose, merely functions as a carrier for the solid organic peroxide it makes no difference whether or not it becomes vaporized prior to reaching reaction temperature since the peroxide at that point in the process has already been distributed throughout the ingredients.

Some examples of suitable peroxides include di-t-butyl peroxide, t-butyl hydroperoxide, methyl ethyl ketone peroxide, t-butyl perbenzoate, t-butyl peracetate, t-butyl peroxypivalate, acetyl peroxide, t-butyl peroctoate, t-butyl peroxyisobutyrate, decanoyl peroxide, lauroyl peroxide, benzoyl peroxide, 2,5 - dimethylhexane - 2,5-diperoxybenzoate, cyclohexanone peroxide, cumene hydroperoxide, p-menthane hydroperoxide, di-t-butyl-diperoxyphthalate, cumyl peroxide, caproyl peroxide, and the like. Of course, there are additional organic peroxides in this group but are too numerous to attempt to individually name. In the event it is desirable to use a solvent some which would be suitable include benzene, mineral spirits, toluene, chlorobenzene, dichlorobenzene, acetone, dimethyl phthalate, t-butyl alcohol, anisole, Decalin, xylene and others which possess the required inertness to the reaction. The use of xylene for this purpose also offers additional advantages in the reaction in that it functions to control the melt flow of the resulting composition, all of which is described later herein. As mentioned previously, it is preferred that the organic peroxide be in a liquid form or capable of dissolution in a substantially inert organic solvent at or near the temperature at which the particular reaction is carried out.

It is pointed out that oxygen cannot be employed in the process even though it is sometimes regarded as a free radical initiator. Oxygen is known to cause deleterious effects on polymerizable monomers such as the ethylenically unsaturated compounds and acrylic esters used in this invention (see page 36 of the reprint of Chapters I–IV from Monomeric Acrylic Esters by E. H. Riddle, 1954).

Selection of a particular organic peroxide or mixture of organic peroxides of the type mentioned above may be easily determined based on the temperature at which the particular reaction is to be carried out and the corresponding decomposition rate of the peroxides as evidenced by their respective half-lives. The half-lives of peroxides are well known and may be readily ascertained (see U.S. 3,293,233 and Encyclopedia of Chemical Technology, Kirk-Othmer, 2nd Edition, vol. 14, pp. 810–813).

Optionally, for melt flow control purposes, either xylene or an acrylic ester of a diol or triol or mixtures thereof may be employed in the reaction mass and subjected to reaction conditions along with the olefin polymer and polymerizable compound. The melt flow control effect achieved with the use of these modifiers in the reaction is one of lowering the melt flow. Thus, without the use of these modifiers the modified polyolefin compositions tend to have rather high melt flow values whereas when these modifiers are employed in the reaction the melt flow values of the modified compositions are significantly lower. All of this is described in the aforementioned Pat. No. 3,699,186.

The acrylic esters of diols or triols which may be used as the modifier in the invention include those defined by the following formula

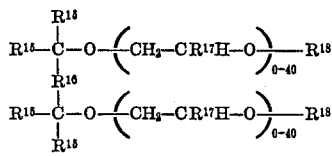

wherein each $R^{15}$ is H or $C_1$–$C_4$ alkyl;

$R^{16}$ is

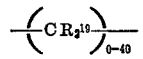

wherein $R^{19}$ is H or $C_1$–$C_4$ alkyl;

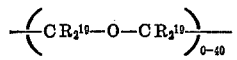

wherein $R^{19}$ is defined above;

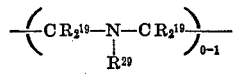

wherein $R^{19}$ is defined above and $R^{20}$ is H or

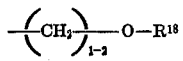

or

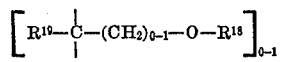

wherein $R^{19}$ is defined above;

$R^{17}$ for each unit is H or —$CH_3$; and

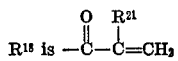

wherein $R^{21}$ is H or —$CH_3$

The above acrylic esters are either commercially available or may be prepared by conventional direct esterification techniques involving reaction between acrylic acid or methacrylic acid and the particular diol or triol. Conventional acylation techniques may also be used wherein acryloyl chloride or methacryloyl chloride are substituted for the acids in reacting with the diols or triols. Any diol or triol coming within the scope of the corresponding portion of the above structural formula may be used for such preparation. For example, ethylene glycol, diethylene glycol, triethylene glycol, tetraethylene glycol, propylene glycol, dipropylene glycol, polypropylene glycols, hexylene glycol, 2-methyl-2-ethyl-1,3-propanediol, 2-ethyl-1,3-hexanediol, 1,5-pentanediol, glycerin, 1,2,6-hexanetriol, triethanol amine, diethanol amine, 1,4-butanediol, polyethylene glycol, 1,2,4-hexanetriol, trimethylol ethane, trimethylol propane, poly(oxypropylene)-poly(oxyethylene) glycols and alkylene triols, poly(oxypropyleneoxyethylene) glycols and alkylene triols, and the like.

The preferred acrylic esters are those defined by the formula

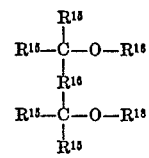

wherein each $R^{15}$ is H or —$CH_3$;

$R^{16}$ is

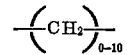

or

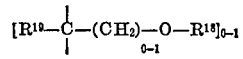

wherein $R^{19}$ is H or $C_1$–$C_4$ alkyl; and $R^{18}$ is

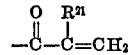

wherein $R^{21}$ is H or —$CH_3$.

The ingredients, that is the olefin polymer in particulate form, the polymerizable compound, the organic peroxide, and optionally the ingredients for melt flow control, are admixed on a substantially dry basis. The amount of liquid is insufficient to cause any discernible change in the dry-appearance of the mixture. The admixing of the ingredients may be accomplished by merely charging the ingredients, separately or simultaneously to a mixing apparatus such as a Henschel mixer. After achieving homogenization of the ingredients in the mixer, the mixer is transferred to a reaction zone for reaction as hereinafter described. Rather than separately mixing the ingredients remote from the reaction they may also be charged directly to a reactor equipped with some means for agitation or tumbling to achieve homogenization of the ingredients within the reaction zone.

In any event, once the mixture is present in the reaction zone the zone is purged of any oxygen with an inert gas and the reaction is conducted at a temperature which is below the tacky point of the olefin polymer to avoid agglomeration of the polymer particles. The tacky point of the olefin polymer is defined as that temperature at which the surfaces of the polymer particles become sufficiently soft so as to be tacky and tend to stick to one another and to other surfaces. Preferably, some mild agitation is provided to insure good heat transfer and help to maintain the homogeneity of the mixture during reaction. The precise temperature at which the reaction will be carried out will vary depending on the specific olefin polymer, the specific polymerizable compound and the specific organic peroxide or peroxide mixture employed. Generally, it will be somewhere in the range of 0° C. up to below the tacky point of the olefin polymer. For polypropylene the upper temperature limit will be about 150° C., for high density polyethylene (e.g. 0.930 and above) it will be about 120° C. and for low density polyethylene (e.g. below 0.930) it will be about 90° C. Thus, it is apparent that the upper temperature limit will vary considerably depending on the particular polymer.

The pressure at which the reaction is conducted is not critical and, in general, good results can be obtained at pressures in the range of atmospheric up to about 1000 p.s.i. For practical reasons it is convenient to operate from about atmospheric up to about 200 p.s.i. Since oxygen has some adverse effect on the reaction it is desirable to conduct the reaction in a substantially oxygen-free atmosphere if possible. While small amounts of oxygen can probably be tolerated in the system, effort should be made to prevent introduction of additional oxygen over and above what may be initially present. Preferably, the reaction zone is purged with an inert gas to remove any oxygen prior to conducting the reaction. In some instances it may be convenient to merely close the system after such purging and begin the reaction whereby an autogenous pressure is built up and maintained. In other instances it may be convenient to close the system after purging and pressurize the reaction zone with the inert gas, e.g. carbon dioxide, nitrogen, argon, etc. This may be desirable to prevent excessive volatilization of any highly volatile ingredients that may be employed.

The reaction zone may be of a fluid bed type wherein the admixed ingredients are charged to form the bed. The system is then purged with the inert gas to remove oxygen and closed. An externally heated inert gas is then continuously circulated through the bed as is known in these systems and the reaction proceeds. The movement of the inert gas through the bed conveniently provides agitation sufficient to aid heat transfer and maintain the homogeneity.

In a variation of the above described fluid bed reaction, it is also possible to form the bed solely from the olefin polymer particles and inject the necessary quantities of the polymerizable compound and organic peroxide into the heated gas stream prior to its passage through the bed of polymer particles. In this manner, the flow of the gas stream serves to agitate the polymer particles and uniformly distribute the polymerizable compound and organic peroxide throughout the particles as the reaction proceeds.

Another type of reaction zone for conducting the process of this invention is provided by a vessel equipped with helical ribbons. With this system it is not necessary to separately mix the ingredients and then charge them to the vessel as the ribbons in the vessel will adequately mix the materials when separately charged. Of course, the usual purging with an inert gas is necessary. Heating of the mixture is accomplished through external jacketed heating means. The ribbons function to aid heat transfer and maintain good mixing of the ingredients.

In conducting the reaction it is desirable to completely decompose the organic peroxide before recovering the product as the presence of any residual peroxide, even in small quantities, may adversely affect the resulting composition in subsequent compounding, molding or extruding operations.

The resulting modified polyolefin composition may be easily recovered directly from the reaction zone in particle form and thus is suitable for subsequent operations as mentioned above without any further steps such as comminuting.

As mentioned previously the blends of this invention are formed by blending the above-modified polyolefin composition, generally from 1% to 50% by weight, preferably 1% to 20% by weight, with an unmodified polyolefin composition, generally from 50% to 99% by weight. The unmodified polyolefin may include any olefin polymer derived from alpha-olefin monomers having 2 to 10 carbon atoms such as polyethylene, polypropylene, poly-(butene-1), poly(4-methyl pentene-1), ethylene-propylene random and block copolymers and terpolymers of ethylene-propylene-butene-1. The unmodified polyolefin may be the same as the olefin polymer used to prepare the modified polyolefin composition or may contain a monomer which is also present in the olefin polymer of the modified polyolefin composition.

The blends may be formed by merely physically tumbling the two components together or the two components may be intensively mixed using heat in a Banbury, a two-roll mill or an extruder.

Various additives may be incorporated into the blends, or one or the other component, or both components. Such additives include fillers, stabilizers, antioxidants, slip agents, anti-static agents, mold release agents, flame retardants, pigments and the like.

The blends of this invention exhibit certain synergistic adhesiveness characteristics and are particularly suitable for producing fiber reinforced compositions, e.g. blends containing 5% to 90% glass fibers, and coatings for various substrates, e.g. metal surfaces such as the interiors of metallic containers.

The synergistic adhesiveness properties of the blends are demonstrated by the adhesion of the blends to reinforcing glass fibers as indicated by flexural strength and modulus properties of molded test specimens of such reinforced blends. The following examples serve to illustrate this synergism.

EXAMPLE 1

(A) 9 parts by weight of polypropylene powder and
(B) 1 part by weight of a modified polypropylene composition prepared by reacting 100 parts by weight polypropylene powder and 1.5 parts by weight glycidyl acrylate in the presence of 0.5 part by weight t-butyl peracetate (75% solution in benzene). The preparation compised mixing the ingredients in a Waring Blender, charging them to a purged reactor equipped with a stirrer followed by heating to about 125° C. with stirring under autogenous pressure and maintaining that temperature for about four hours. After cooling, the modified polypropylene composition was recovered in a particulate form.

A blend in accordance with this invention was prepared by physically mixing the following:

In order to demonstrate the synergistic adhesiveness characteristics of the blend, samples of the blend and the modified polypropylene composition were each reinforced with 20% by weight chopped glass fibers (¼ inch—OCF 885) using conventional extrusion techniques. Each reinforced sample was then molded into test specimens and tested for flexural strength and modulus in accordance with ASTM D-790-66. The results are indicated in the following table along with the average typical results obtained from identical testing of several samples of polypropylene (unmodified) reinforced with 20% by weight glass fibers (¼ inch—OCF 885).

TABLE 1

| Composition with 20% glass fibers | Flexural strength (p.s.i.) | Flexural modulus (p.s.i.) ($\times 10^5$) |
|---|---|---|
| Polypropylene | 10,000 | 4.9 |
| Modified polypropylene | 14,800 | 5.0 |
| Blend:[1] | | |
| Predicted | ca. 10,500 | ca. 4.9 |
| Actual | 14,500 | 5.4 |

[1] Blend comprises 9 parts by weight polypropylene and 1 part by weight modified polypropylene composition in accordance with this invention.

EXAMPLE 2

A series of blends in accordance with the invention were prepared employing modified polypropylene compositions each of which was derived from 100 parts by weight powder polypropylene and varying amounts of glycidyl acrylate in the presence of 0.5 part by weight t-butyl peracetate. The modified polypropylene compositions were prepared as in Example 1 except that the reaction was conducted in a continuously rotated 1-liter flask partially immersed in a constant temperature oil bath (125° C.) for about four hours. The several blends and corresponding modified polypropylene compositions were reinforced with 20% by weight glass fibers and tested in the same manner as described in Example 1. The results are indicated in the following table.

TABLE 2

| Series No. | Composition with 20% glass fibers (PP, MPP, blend) | Glycidyl acrylate (parts by weight in MPP) | Weight ratio of PP to MPP in blend | | Flexural strength (p.s.i.) | Flexural modulus (p.s.i.) (×10⁵) |
|---|---|---|---|---|---|---|
| Control | PP | | | | 10,000 | 4.9 |
| A | MPP | 1.0 | | | 15,000 | 5.1 |
| | Blend | | 9/1 | Actual | 14,100 | 5.2 |
| | do | | 9/1 | Predicted | ca. 10,600 | ca. 4.9+ |
| B | MPP | 1.0 | | | 14,800 | 4.7 |
| | Blend | | 9/1 | Actual | 14,700 | 5.0 |
| | do | | 9/1 | Predicted | ca. 10,500 | ca. −4.9 |
| C | MPP | 1.5 | | | 15,100 | 5.5 |
| | Blend | | 9/1 | Actual | 14,100 | 5.5 |
| | do | | 9/1 | Predicted | ca. 10,500 | ca. +4.9 |
| D | MPP | 1.5 | | | 15,400 | 5.1 |
| | Blend | | 9/1 | Actual | 14,100 | 5.6 |
| | do | | 9/1 | Predicted | ca. 10,500 | ca. +4.9 |
| E | MPP | 2.0 | | | 14,500 | 4.5 |
| | Blend | | 9/1 | Actual | 13,600 | 5/− |
| | do | | 9/1 | Predicted | ca. 10,500 | ca. −4.9 |
| F | MPP | 2.0 | | | 13,900 | 4.5 |
| | Blend | | 9/1 | Actual | 13,800 | 5.1 |
| | do | | 9/1 | Predicted | ca. 10,400 | ca. −4.9 |
| G | MPP | 3.0 | | | 15,600 | 5.2 |
| | Blend | | 9/1 | Actual | 14,800 | 5.0 |
| | do | | 9/1 | Predicted | ca. 10,600 | ca. +4.9 |
| | do | | 14/1 | Actual | 14,700 | 5.2 |
| | do | | 14/1 | Predicted | ca. 10,400 | ca. +4.9 |
| | do | | 19/1 | Actual | 14,300 | 5.3 |
| | do | | 19/1 | Predicted | ca. 10,300 | ca. +4.9 |

Note.—PP=polypropylene, MPP=modified polypropylene composition.

EXAMPLE 3

A blend in accordance with the invention was prepared and tested in a manner similar to that described in Example 2 except that a block copolymer of propylene and ethylene was employed in place of polypropylene in preparing the modified polyolefin composition. The modified polyolefin composition was prepared using 100 parts by weight block copolymer, 1 part by weight glycidyl acrylate and 0.5 part by weight t-butyl peracetate. The results of the tests appear in the following table.

TABLE 3

| Composition with 20% glass fibers | Flexural strength (p.s.i.) | Flexural modulus (p.s.i.) (×10⁵) |
|---|---|---|
| Polypropylene | 10,000 | 4.9 |
| Modified block copolymer | 13,800 | 3.6 |
| Blend:¹ | | |
| Actual | 12,700 | 3.8 |
| Predicted | ca. 10,400 | ca. 4.8− |

¹ Blend comprises 9/1 weight ratio of polypropylene to modified block copolymer.

EXAMPLE 4

A blend in accordance with the invention was prepared and tested as in Example 3 except that a modified polypropylene composition was blended with a block copolymer of propylene and ethylene. The modified polypropylene composition was prepared using 100 parts by weight polypropylene, 3 parts by weight glycidyl acrylate and 0.5 part by weight t-butyl peracetate. The results of the tests appear in the following table.

TABLE 4

| Composition with 20% glass fibers | Flexural strength (p.s.i.) | Flexural modulus (p.s.i.) (×10⁵) |
|---|---|---|
| Block copolymer of propylene and ethylene | 8,700 | 4.6 |
| Modified polypropylene | 15,100 | 4.5 |
| Blend:¹ | | |
| Actual | 12,700 | 4.3 |
| Predicted | ca. 9,400 | ca. 4.6− |

¹ Blend comprises 9/1 weight ratio of block copolymer of propylene and ethylene with modified polypropylene composition.

EXAMPLE 5

A blend in accordance with the invention was prepared and tested as in Example 2 except that the modified polypropylene composition was prepared using 100 parts by weight polypropylene, 2 parts by weight γ-methacryloxypropyl trimethoxy silane and 0.5 part by weight t-butyl peracetate. The results of the tests appear in the following table.

TABLE 5

| Composition with 20% glass fibers | Flexural strength (p.s.i.) | Flexural modulus (p.s.i.) (×10⁵) |
|---|---|---|
| Polypropylene | 10,000 | 4.9 |
| Modified polypropylene | 16,500 | 5.0 |
| Blend:¹ | | |
| Actual | 15,400 | 5.0 |
| Predicted | ca. 10,700 | ca. 4.9+ |

¹ Blend comprises 9/1 weight ratio of polypropylene with modified polypropylene composition.

EXAMPLE 6

A blend in accordance with the invention was prepared and tested in a manner similar to that described in Example 2 except that the modified polyolefin composition was prepared from 100 parts by weight polypropylene and 1.5 parts by weight glycidyl acrylate in the presence of 2.0 parts by weight xylene (melt flow control) and 0.5 part by weight t-butyl peracetate. The blend was prepared from the above modified polypropylene composition and unmodified polypropylene. The results of the tests appear in the following table.

TABLE 6

| Composition with 20% glass fibers | Flexural strength (p.s..i) | Flexural modulus (p.s.i.) (×10⁵) |
|---|---|---|
| Polypropylene | 10,000 | 4.9 |
| Modified polypropylene | 14,600 | 4.6 |
| Blend:¹ | | |
| Actual | 14,300 | 4.9 |
| Predicted | ca. 10,500 | ca. 4.9− |

¹ Blend comprises 9/1 weight ratio of polypropylene with modified polypropylene composition.

EXAMPLE 7

A blend in accordance with the invention was prepared and tested in a manner similar to that described in Example 2 except that the modified polyolefin composition was prepared from 100 parts by weight polypropylene, 1.5 parts by weight glycidyl acrylate, and 1.0 part by weight ethylene glycol dimethacrylate in the presence of 0.5 part by weight t-butyl peracetate. The blend was prepared from the above-modified polypropylene composition and unmodified polypropylene. The test results are shown in the following table.

TABLE 7

| Composition with 20% glass fibers | Flexural strength (p.s.i.) | Flexural modulus (p.s.i.) (×10⁵) |
|---|---|---|
| Polypropylene | 10,000 | 4.9 |
| Modified polypropylene | 15,500 | 5.1 |
| Blend:[1] | | |
| Actual | 14,600 | 5.0 |
| Predicted | 10,600 | 4.9+ |

[1] Blend comprises 9/1 weight ratio of polypropylene and modified polypropylene composition.

EXAMPLE 8

A blend in accordance with the invention was prepared and tested as in Example 5 except that the blend was 1/1 weight ratio of modified polypropylene composition with unmodified polypropylene. The modified polypropylene was prepared using 100 parts by weight polypropylene powder, 2 parts by weight glycidyl acrylate, and 0.75 part by weight t-butyl peracetate. The results of the tests appear in the following table.

TABLE 8

| Composition with 20% glass fibers | Flexural strength (p.s.i.) | Flexural modulus (p.s.i.) (×10⁵) |
|---|---|---|
| Polypropylene | 10,000 | 4.9 |
| Modified polypropylene | 15,000 | 5.2 |
| Blend:[1] | | |
| Actual | 15,300 | 5.2 |
| Predicted | 12,500 | 5.1— |

[1] Blend comprises 1/1 weight ratio of polypropylene and modified polypropylene composition.

Thus having described the invention in detail it will be understood by those skilled in the art that certain variations and modifications may be made without departing from the spirit and scope of the invention as described herein or in the appended claims.

We claim:

1. A blend comprising (1) from about 50 to about 99 percent by weight of an olefin polymer derived from alpha-olefin monomers having 2 to 10 carbon atoms and (2) from about 1 to about 50 percent by weight of a reaction product of
   (A) at least one olefin polymer derived from alpha-olefin monomers having 2 to 10 carbon atoms, and
   (B) from about 0.01 to about 10 percent by weight of the olefin polymer of at least one polymerizable compound defined by

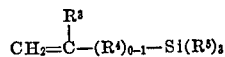

wherein
   R³ is hydrogen or an alkyl radical having 1 to 4 carbon atoms;
   R⁴ is a straight, branched or cyclic alkylene radical having 1 to 10 carbon atoms with or without pendant glycidoxy groups, a substituted or unsubstituted phenylene group with or without pendant glycidoxy groups;

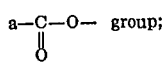

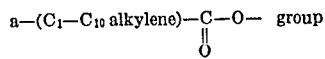

with or without pendant glycidoxy groups;

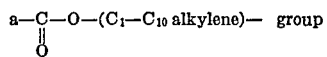

with or without pendant glycidoxy groups; or

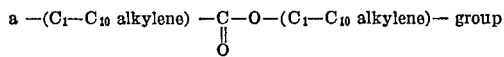

with or without pendant glycidoxy groups; and
   R⁵ is halogen, an alokoxy radical having 1 to 10 carbon atoms or an acyloxy radical having 1 to 10 carbon atoms, said reaction product having been produced in a process which comprises admixing the olefin polymer in particulate form with an organic peroxide and the polymerizable compound to provide a substantially dry mixture; reacting the resulting mixture in an inert atmosphere at a temperature below the tacky point of the olefin polymer, and recovering the product directly from the reaction in particulate form.

2. A blend according to claim 1 wherein the olefin polymer of the reaction product is polypropylene, polyethylene, or a copolymer of ethylene and propylene.

3. A blend according to claim 1 wherein the olefin polymer of (1) is polypropylene, polyethylene or a copolymer of propylene and ethylene.

4. A blend according to claim 1 wherein the reaction product includes, in addition to (A) and (B), (C) at least one modifier defined by the formula

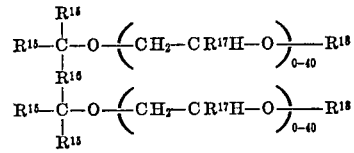

wherein each
R¹⁵ is H or C₁–C₄ alkyl;
R¹⁶ is

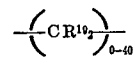

wherein R¹⁹ is H or C₁–C₄ alkyl;

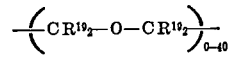

wherein R¹⁹ is defined above;

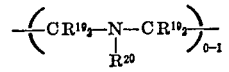

wherein R¹⁹ is defined above and R²⁰ is H or

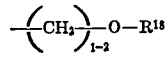

or

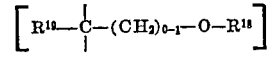

wherein R¹⁹ is defined above;
R¹⁷ for each unit is H or —CH₃; and
R¹⁸ is

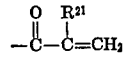

wherein R²¹ is H or —CH₃.

5. A blend according to claim 1 wherein the polymerizable compound is defined by

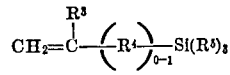

wherein

R³ is H or a C₁–C₄ alkyl radical,
R⁴ is a C₁–C₁₀ alkylene group and
R⁵ is halogen, a C₁–C₁₀ alkoxy radical or a C₁–C₁₀ acyloxy radical.

6. A blend according to claim 1 containing 5% to 90% by weight reinforcing fibers.

7. A metallic article coated with the blend of claim 1.

8. A blend according to claim 1 wherein the olefin polymer of (1) is polypropylene, polyethylene, or a copolymer of ethylene and propylene; the reaction product of (2) is derived from (A) polypropylene, polyethylene, or a copolymer of ethylene and propylene, (B) a polymerizable compound which is γ-methacryloxypropyl trimethoxy silane, and containing (C) a modifier which is ethylene glycol diacrylate, ethylene glycol dimethacrylate, trimethylol propane triacrylate, trimethylol propane trimethacrylate, 1,3-butylene diacrylate, or 1,3-butylene dimethacrylate, in the presence of an organic peroxide.

9. A process for preparing a synergistic blend of modified and unmodified polyolefins which comprises (A) providing an olefin polymer in particulate form, said olefin polymer being derived from alpha-olefin monomers having 2 to 10 carbon atoms;

(B) admixing the olefin polymer in particulate form with an organic peroxide and from 0.01 to 10 percent based on the weight of the olefin polymer of a polymerizable compound to provide a substantially dry mixture, said polymerizable compound defined by

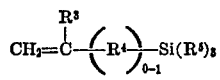

wherein

R³ is hydrogen or an alkyl radical having 1 to 4 carbon atoms;
R⁴ is a straight, branched or cyclic alkylene radical having 1 to 10 carbon atoms with or without pendant glycidoxy groups, a substituted or unsubstituted phenylene group with or without pendant glycidoxy groups;

a —C—O— group;
   ‖
   O a —(C₁-C₁₀ alkylene)—C—O— group
                    ‖
                    O with or without pendant glycidoxy groups;

a —C—O—(C₁-C₁₀ alkylene)— group
   ‖
   O with or without pendant glycidoxy groups; or a —(C₁-C₁₀ alkylene) —C—O—(C₁-C₁₀ alkylene)— group
                     ‖
                     O with or without pendant glycidoxy groups; and
R⁵ is halogen, an alkoxy radical having 1 to 10 carbon atoms or an acyloxy radical having 1 to 10 carbon atoms.

(C) reacting the resulting mixture at a temperature below the tacky point of the olefin polymer to provide a modified polyolefin composition and (D) admixing from about 1 to about 50 percent by weight of said modified polyolefin composition with about 50 to about 99 percent by weight of an olefin polymer derived from alpha-olefin monomers having 2 to 10 carbon atoms.

References Cited
UNITED STATES PATENTS

| | | | |
|---|---|---|---|
| 3,573,334 | 3/1971 | Wheeler | 260—827 |
| 3,505,279 | 4/1970 | Preston et al. | 260—827 |
| 3,075,948 | 1/1963 | Santelli | 260—827 |
| 3,644,141 | 2/1972 | Preston | 260—827 |
| 3,644,245 | 2/1972 | Flanagan et al. | 260—827 |
| 3,646,155 | 2/1972 | Scott | 260—827 |

WILBERT J. BRIGGS, SR., Primary Examiner

U.S. Cl. X.R.

117—132 BS; 260—836, 897 R, 897 B, 901

PO-1050
(5/69)

UNITED STATES PATENT OFFICE
CERTIFICATE OF CORRECTION

Patent No. 3,804,919          Dated April 16, 1974

Inventor(s) Albert Schrage and Arnold B. Finestone

It is certified that error appears in the above-identified patent and that said Letters Patent are hereby corrected as shown below:

Column 3, line 12, that portion of the formula reading:

$H_2\!\!-\!\!|$         should read     a $-CH_2\!\!-\!\!|$

Column 8, lines 26 and 27 should be transposed with lines 28 and 29.

Column 12, line 10, "alokoxy" should read --alkoxy--

Signed and sealed this 10th day of September 1974.

(SEAL)
Attest:

McCOY M. GIBSON, JR.                 C. MARSHALL DANN
Attesting Officer                     Commissioner of Patents